United States Patent [19]
Moser

[11] Patent Number: 4,984,551
[45] Date of Patent: Jan. 15, 1991

[54] METHOD AND DEVICE FOR LAMBDA CONTROL WITH A PLURALITY OF PROBES

[75] Inventor: Winfried Moser, Ludwigsburg, Fed. Rep. of Germany

[73] Assignee: Robert Bosch GmbH, Stuttgart, Fed. Rep. of Germany

[21] Appl. No.: 473,934

[22] PCT Filed: May 31, 1989

[86] PCT No.: PCT/DE89/00349

§ 371 Date: Feb. 26, 1990

§ 102(e) Date: Feb. 26, 1990

[87] PCT Pub. No.: WO89/12737

PCT Pub. Date: Dec. 28, 1989

[30] Foreign Application Priority Data

Jun. 24, 1988 [DE] Fed. Rep. of Germany ....... 3821357

[51] Int. Cl.[5] ...................... F02D 41/14; G01N 27/50; G05D 11/00

[52] U.S. Cl. .................................................... 123/489

[58] Field of Search ....................... 123/440, 489, 589; 60/276, 285

[56] References Cited

U.S. PATENT DOCUMENTS 4,088,096 5/1978 Bossi et al. .......................... 123/489
4,149,502 4/1979 Johnson et al. ................. 123/489 X
4,231,334 11/1980 Peter .................................. 123/440
4,251,989 2/1981 Norimatsu et al. ............. 123/489 X
4,337,746 7/1982 Masaki ............................... 123/489
4,383,515 5/1983 Higashiyama et al. ............ 123/489
4,401,081 8/1983 Wessel et al. .................. 123/489 X
4,699,111 10/1987 Yasuoka ............................. 123/489
4,703,735 11/1987 Minamitani et al. ................ 123/489

FOREIGN PATENT DOCUMENTS 0271628 10/1989 Japan .................................. 123/489

*Primary Examiner*—Willis R. Wolfe
*Attorney, Agent, or Firm*—Walter Ottesen

[57] ABSTRACT

A method for lambda control works with two control circuits for different groups of cylinders. In each control circuit, a two-position control is carried out which leads to a control oscillation in each case. The phase shift between the two oscillations is determined and set to a predetermined value. If the predetermined value of the phase shift corresponds to half an oscillation period, this leads to the condition that the exhaust gas from one group of cylinders oscillates from rich to lean exactly when the exhaust gas from the other group of cylinders oscillates from lean to rich, and vice versa. If these two exhaust gases are mixed in front of a catalyst, the latter receives a mixed gas which has essentially the lambda value 1. The method thus makes it possible to obtain an amplitude of oscillation of the lambda value of the exhaust gas which is lower than the amplitudes of oscillation of the lambda values of the air/fuel mixtures fed to the two groups of cylinders. This results in an improved conversion of harmful substances. A device for carrying out the above method has two means for two-position control, a means for determining the actual phase shift and a means for setting the desired phase shift.

8 Claims, 3 Drawing Sheets

METHOD AND DEVICE FOR LAMBDA CONTROL WITH A PLURALITY OF PROBES

FIELD OF THE INVENTION

The invention relates to a method and a device for lambda control in an internal combustion engine with at least two lambda probes.

BACKGROUND OF THE INVENTION

A plurality of lambda probes on an internal combustion engine are used in two fundamentally different arrangements. In one arrangement, the plurality of probes is located in the exhaust-gas channel of the internal combustion engine at successive locations. In the other arrangement, the lambda probes are each mounted in an identical position in different component channels of the exhaust-gas channel system. The invention relates to an arrangement of the last-mentioned type.

An arrangement of this type is provided, for example, for the methods and devices according to U.S. Pat. No. 4,231,334 and published German application DE-Al-2,255,879 corresponding to U.S. Pat. application Ser. No. 401,195 and filed on 9-27-73. In each case, a lambda probe is arranged in the exhaust-gas component channel of each half of a V-type engine in front of the particular point before the two component channels are combined to form a manifold, in which a catalyst is arranged. In the method according to DE-Al-2,255,874, the signals of the two probes serve for supplying actual values for two separate control circuits, each of which is assigned to one half of the engine. In the method according to DE-Al-2,713,988, the signals of the two probes serve as actual values for a single control circuit. In accordance with the nature of the signals from the two probes, a decision is made as to whether the controller increases or decreases the regulating value or leaves it unchanged. Furthermore, the regulating value is wobbled as a function of a summed control deviation in such a way that, on top of the conventional oscillation of the two-position controller, the mixture alternates between rich and lean rapidly and continuously.

The known methods and devices serve for supplying air/fuel mixtures which result in exhaust gas of such a kind that harmful substances still present in the exhaust gas can be converted as efficiently as possible by means of a catalyst.

The object on which the invention is based is to provide a method for lambda control in an internal combustion engine with at least two lambda probes in an identical position, which allows an even better conversion of harmful substances than previous methods. A further object of the invention is to providing a device for carrying out such a process.

SUMMARY OF THE INVENTION

The method according to the invention is characterized in that at least two different air/fuel mixtures for different cylinders are put under two-position control in different control circuits and desired phase shifts are set between the control oscillations. The device according to the invention has at least one means for the two-position control, one means for determining the actual phase shift and one means for setting the desired phase shift between each two control circuits.

The invention makes use of the following consideration. In a two-position lambda control, the lambda value continuously executes oscillations between rich and lean. The larger the amplitude of these oscillations, the lower the relative conversion of harmful substances by the catalyst. Now if two control circuits are used instead of a single control circuit, it must be possible to match the oscillations in the two circuits to one another in such a way that the mixture in one control circuit oscillates in the rich direction exactly when the mixture in the other control circuit oscillates in the lean direction. The exhaust gases of the rich mixture and of the lean mixture come together in the manifold in front of the catalyst and there result in exhaust gas of approximately the lambda value 1. The lambda value of the exhaust gas will undergo hardly any oscillation if the phase shift amounts to approximately half an oscillation period. If it is more or less, there is still an oscillation of the lambda value, but with a considerably lower amplitude than without any phase shift of the two control oscillations. The amplitude can be fixed by the extent of the phase shift. A slight residual oscillation is desirable for some catalysts, since these work with the highest possible efficiency only when they can work with an oxidizing effect during one particular half period of the control oscillation and operate reductively during the other half period.

The known methods mentioned above are intended for engines in which, because of their design, there are very long exhaust-gas component channels, that is, they are especially for V-type engines. In contrast, the method according to the invention affords advantages in all types of engines, that is also, for example, in a four-cylinder in-line engine. There, a probe to which a control circuit is assigned can be arranged in each outlet pipe. The phase shifts between the four control circuits are set so that exhaust gas mixed in the manifold, having essentially the lambda value 1, is obtained, or that, for the reason mentioned above, there is still a slight residual lambda oscillation in the mixed exhaust gas.

The phase correction can then be carried out especially simply, if continuous reference is made to the phase of a specific control circuit. In contrast, the control becomes faster if variable reference is made to the earliest oscillation.

BRIEF DESCRIPTION OF THE DRAWINGS

The invention is explained in detail below with reference to exemplary embodiments illustrated by figures. Of these.

DESCRIPTION OF THE PREFERRED EMBODIMENTS OF THE INVENTION

Figure 1:
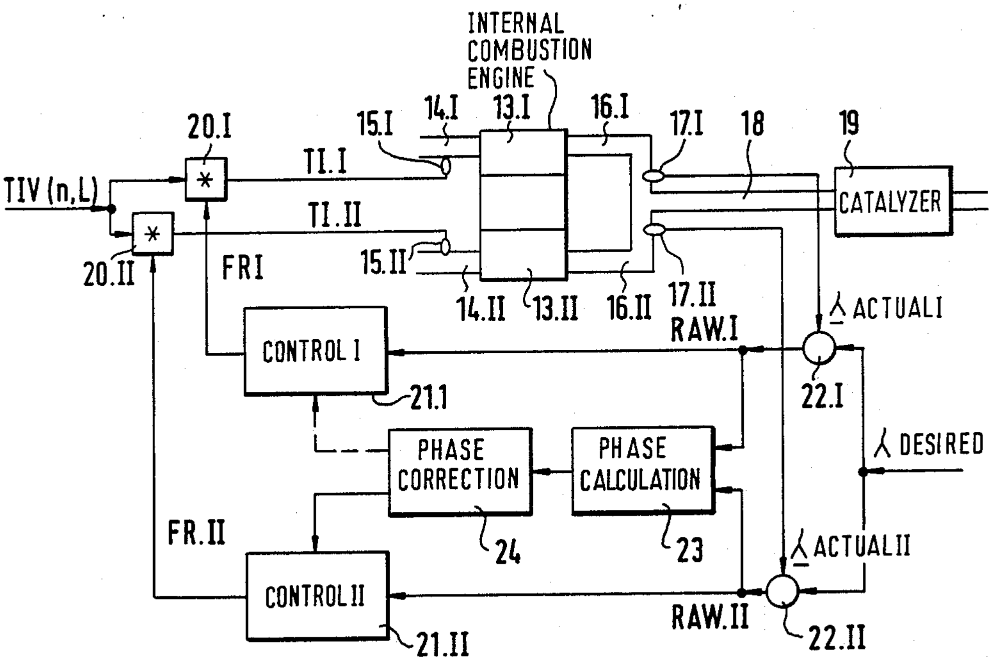
FIG. 1 shows a method, illustrated as a block diagram, of lambda control with two probes and two control circuits between which a predetermined phase shift is set.

The method according to the block diagram of FIG. 1 works on an internal combustion engine 12 with a first bank of cylinders 13.I and a second bank of cylinders 13.II. In the suction channel 14.I for the first bank of cylinders 13.I there is a first injection-valve arrangement 15.I. A corresponding second injection-valve arrangement 15.II is located in the second suction channel 14.II. A first lambda probe 17.I is arranged in the exhaust-gas component channel 16.I and a second lambda probe 17.II is arranged correspondingly in the second exhaust-gas component channel 16.II. The two exhaust-gas component channels open into a manifold 18, in which a catalyst 19 is arranged.

The method for controlling the mixture composition for the first bank of cylinders 13.I is explained in the following in broad outline with further reference to FIG. 2. The first injection-valve arrangement 15.I is fed a first injection-time signal TI.I which is formed by multiplying a signal TIV (n, L) for a predetermined injection time with a control factor FR.I in a multiplication step 20.I. The control factor FR.I is the output value of control step 21.I in response to a control-deviation signal RAW.I. The control-deviation value RAW.I is formed by subtracting the signal lambda act.I of the first lambda probe 17.I from a lambda desired value in a subtraction step 22.I Corresponding method steps are performed in the control circuit which adjusts the mixture fed to the second bank of cylinders 13.II. The actual control circuits are of considerably refined design. In particular, there are various steps for correcting disturbance variables, and use is made of adaptive methods intended to ensure a continuous adaptation of different correction values to changing conditions.

Figure 2A:
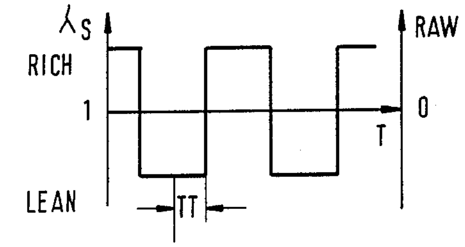
FIGS. 2*a* to 2*c* show time-correlated diagrams of the signal from a lambda probe, of the output value corresponding thereto and of the actual lambda value at the location of the probe.
Figure 2B:
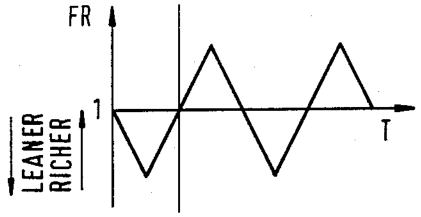
Figure 2C:
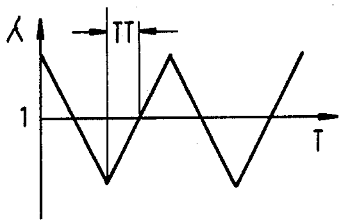

The signal $\lambda_S$ of a lambda probe, as used for two-position control, exhibits a jump behavior in the transition from rich to lean, as illustrated in FIG. 2*a*. The actual course of lambda leading to this jump signal is represented in FIG. 2*c*. FIG. 2*b* serves for an understanding as to how the actual signal course is formed and shows the time course of a control factor FR, whether it is the control factor FR.I for the first control circuit or the factor FR.II for the second control circuit. When the probe signal $\lambda_S$ jumps from rich to lean, or vice versa, the control-deviation signal RAW passes through the value 0 in one direction or the other. During the passage through 0, the direction of integration of the control step 21 changes, with the result that the mixture becomes richer, as soon as the probe signal has jumped to lean and becomes leaner, as soon as it has jumped to rich. As soon as the control factor FR reaches the value 1, the mixture fed to one bank of cylinders has the lambda value 1, on the assumption that the precontrol value TIV (n, L) (n = engine speed; L = load-indicating signal) is determined correctly, this being presupposed here. During the further upward integration of the control factor FR, a rich lambda value is established. However, this is measured by the lambda probe only with a delay by the amount of a dead time TT, this being detectable from the lagging phase shift TT of the probe signal $\lambda_S$ in relation to the control-factor signal FR from FIGS. 2*a* and 2*b*. The signal course according to FIG. 2*c* has the same phase shift in relation to that of FIG. 2*b*. Otherwise, the signal courses of FIGS. 2*c* and 2*b* are represented identically. This is because, if the pilot value is determined correctly and without further correction measures, the lambda value on the injection side corresponds to the value of the control factor FR. Under these preconditions, therefore, FIG. 2*b* represents not only the time course of the control factor, but also the time course of the lambda value on the injection side. In contrast, the time course of the lambda value on the exhaust-gas side according to FIG. 2*c* is shifted by the amount of the dead time TT. During actual operation, the reversal points are also flattened somewhat, although this is not important to the following explanation.

Figure 3:
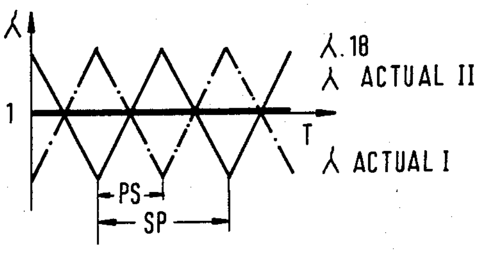
FIG. 3 shows a diagram of the time course of the lambda value of two individual exhaust gases and of the lambda value of the mixed exhaust gas with a phase shift of half an oscillation period.
Figure 4:
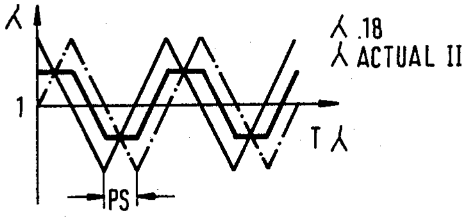
FIG. 4 shows a diagram corresponding to that of FIG. 3, but with a phase shift of less than half an oscillation period.

The representations of FIGS. 3 and 4 correspond to that of FIG. 2*c*, but with the addition that, instead of the course of the lambda signal for a single control circuit, the courses for two control circuits are shown. In FIG. 3, it is assumed that the lambda signal λact.II for the second control circuit is shifted relative to the lambda signal λact.I for the first control circuit by the amount of a phase shift PS which corresponds to half the oscillation period SP. In contrast, in FIG. 4 the phase shift PS amounts to only a quarter of the oscillation period. With a shift of half a period, the mixture in the first control circuit reaches the highest value in the rich direction exactly when the mixture in the second control circuit reaches the highest value in the lean direction, and vice versa. It is also true of the remaining time course that the lambda values are in each instance opposed to one another in relation to the lambda value 1. The result of this for the lambda value λ.18 in the manifold 18 is that it remains essentially continuously at the value 1. In contrast, if, as shown in FIG. 4, the phase shift amounts to more or less than half an oscillation period, the lambda value λ.18 of the mixed exhaust gas in the manifold 18 also oscillates about the value lambda = 1. However, this occurs at a lower amplitude than corresponds to the amplitude of the individual oscillations. The amplitude of oscillation of the lambda value of the mixed exhaust gas can be fixed by the extent of the phase shift. The value to be used in practice depends on the properties of the particular type of catalyst used. If the catalyst requires a particular amplitude of oscillation of the lambda value for alternating oxidization and reduction, an appropriate corresponding lambda shift is set. If the catalyst needs no oscillation of the lambda value, a phase shift of half an oscillation period is preferred.

To make it possible to carry out a phase shift in the way described, the method according to FIG. 1 has a phase calculation step 23 which computes the phase shift between the two control-circuit oscillations from the control-deviation signals RAW.I and RAW.II. The actual phase-shift value is compared to the desired phase-shift value in a phase correction step, and in the event of a deviation, the phase of the one oscillation is shifted relative to the other in such a way that the desired phase-shift value is established.

Some possibilities for computing and correcting the phase shift are now explained with reference to FIGS. 5 to 11. Of these, FIGS. 5 to 8 relate to the method according to FIG. 1, while FIGS. 10 and 11 relate to a modified method which is explained further below with respect to FIG. 9.

The signal courses of FIGs. 5 to 8 and 10 and 11 differ from those of FIGS. 3 and 4 in that now not phase-shifted lambda values, but phase-shifted control factors (corresponding to FIG. 2*b*) are shown. In all the FIGS. mentioned, the course of the control factor FR.I is represented by an unbroken line and the course of the control factor FR.II by a dot-and-dash line. The course of the particular reference phase is marked by a dashed line. Reference points from which the phase shift is measured are shown by heavy dots. In all cases, it is assumed that the desired phase shift is to correspond to half an oscillation period.

Figure 5A:
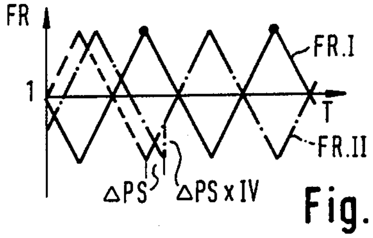
FIGS. 5*a* and 5*b* show diagrams of the time courses of two regulating values with two different types of phase shift for a delayed signal.
Figure 6:
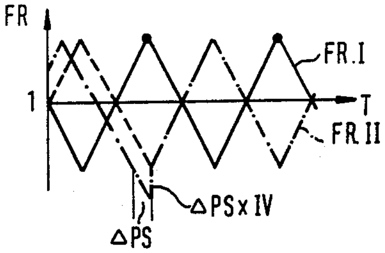
FIG. 6 shows a diagram corresponding to that of FIG. 5*a*, but in respect to the phase shift of a leading signal.

FIGS. 5*a* and 6 will be discussed first. In both cases, the phase of the signal FR.I is the reference phase and the jump of lambda from lean to rich is the reference point. This corresponds to the reversal point in the control factor from an increase to a decrease. At each of these time points in the signal FR.I, the course of the signal FR.II is determined. For this signal, the reversal point is triggered not directly by the jump in the associated probe signal, but by means of the reference point in the signal FR.I. According to FIG. 5*a*, with the signal FR.II lagging, this is carried out by detecting at the reference point that, for the signal FR.II, the associated probe signal has not yet jumped. The time ΔPS is then measured which elapses until the probe signal belonging to the signal FR.II jumps. If this jump point were not delayed by the time interval ΔPS in relation to the reference point, but were instead immediate, the signal FR.II would already have increased in the time interval ΔPS by the value ΔPS×IV, wherein IV is the integration speed. The signal FR.II is therefore increased by the mentioned value APS×IV at the end of the time interval ΔPS, with the result that the lag is eliminated. With a leading signal FR.II, the probe jump from rich to lean for signal FR.II occurs before the probe jump from lean to rich for the signal FR.I. In this case, the reversal of the signal FR.II is not yet allowed, but instead its value is further reduced, specifically until the signal FR.I is reversed in its direction of change, that is it reaches the reference point. The lapsed time interval is also designated as ΔPS in FIG. 6. When the reference point appears, the signal FR.II is increased by the value ΔPS×IV, even if it leads, with the result that the undesirable phase shift ΔPS is cancelled.

Figure 5B:
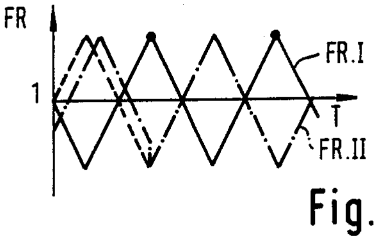

FIG. 5*b* relates in exactly the same way as FIG. 5*a* to the case of the lagging signal FR.II. However, the correction takes place in a different way from that according to FIG. 5*a*. In particular, when the reference point in the signal FR.I appears, the value is determined at which the signal FR.II is just then. This is compared to the value which the signal FR.II should have at its lower reversal point. If the measured value does not correspond to the expected value, the signal FR.II is set to the expected value. The expected value can, for example, be the reversal value in the preceding oscillation, or it can be that value of the reference point for the signal FR.I reflected on the value lambda=1.

Figure 7:
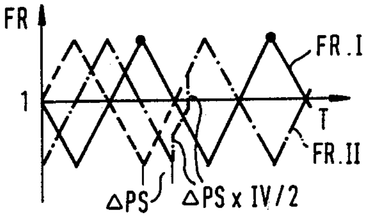
FIG. 7 shows a diagram corresponding to that of FIG. 5*a*, but with a larger phase shift and with a correction of the phase in two steps.

FIG. 7 largely corresponds to FIG. 5*a*, but with the difference that the undesirable phase shift ΔPS is approximately twice as large as in FIG. 5*a*. The result of this is that a very high value is obtained as a correction value ΔPS x IV. If this correction were made in a single step, it could lead to an unsteady driving behavior. Consequently, according to FIG. 7, instead of a single large correction step, two smaller correction steps are used and each step corresponds to the value ΔPS×IV/2. The individual correction steps are carried out in predetermined successive time intervals, for example with each computer cycle for computing the control factors, where an embodiment with a microcomputer is concerned.

Figure 8A:
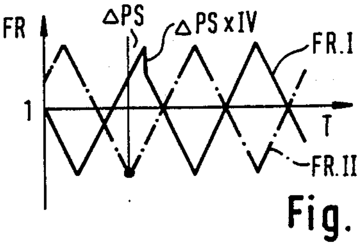
FIGS. 8*a* and 8*b* show diagrams corresponding to those of FIGS. 5*a* and 5*b* but with the leading phase being the reference phase.
Figure 8B:
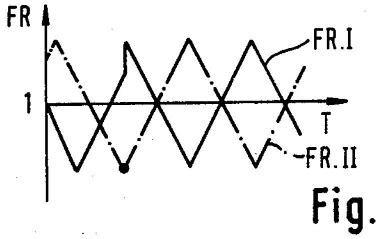

For the representations according to FIGS. 8*a* and 8*b*, it is assumed that reference is no longer made continuously to the phase of the oscillation FR.I, but that reference is made each time to the earliest signal. In the case of FIGS. 8*a* and 8*b*, this is the signal FR.II, since, according to the representation of FIG. 6, it leads the signal FR.I. That signal for which a jump first occurs in the associated probe signal sets a time measurement to 0. This time measurement measures the time interval ΔPS which elapses until the probe signal for the other control-factor signal also jumps. FIGS. 5*a* and 8*a* therefore differ only in that, in FIG. 8*a*, the reference point is located on the leading signal FR.II. As soon as the probe signal for the signal FR.I jumps at the end of the time interval ΔPS, its value is reduced by the amount of the correction value ΔPS x IV. If the signal FR.II were to lag again in relation to the signal FR.I at a later time point, a pattern according to FIG. 5*a* would be obtained. Thus, just as FIGS. 8*a* and 5*a* correspond to one another, so FIGS. 8*b* and 5*b* correspond. In particular, according to FIG. 8*b*, the signal FR.I is increased to the expected amplitude as soon as the probe signal belonging to the control-factor signal FR.II jumps from rich to lean.

In FIGS. 5 and 6, it is therefore assumed that the signal FR.I continuously forms the reference signal for determining the phase shift. In contrast, in the relationship of FIGS. 5 and 8 to each other, it is assumed that in each case, the earliest probe-jump point is the reference point. It has been assumed in all cases that only one specific jump direction for the probe signal is used for forming the reference point, but any probe jump can be adopted.

Figure 9:
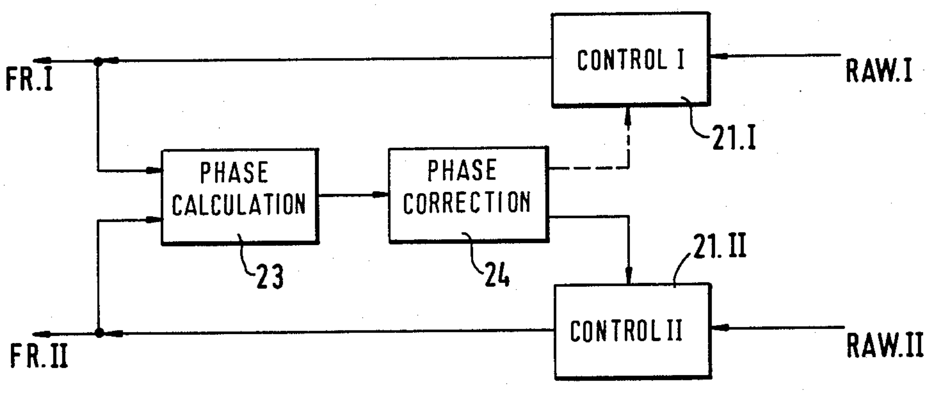
FIG. 9 shows a component method, illustrated as a block diagram, for computing phase and for correcting phase, which is based not on control deviations, as in the method of FIG. 1, but on output values.

As explained above with reference to FIGS. 2*a* and 2*b*, there is a fixed phase shift of the value of the dead time TT between the control-deviation signal RAW and the control-factor signal FR. This phase shift TT applies equally to both control-factor signals FR.I and FR.II, so that it has no influence at all on a mutual shift of these two signals in relation to one another. The computation of the phase shift can therefore not only be carried out by means of the jump signals of the lambda probes 17.I and 17.II, but the control factors FR.I and FR.II can also be compared directly with one another. This is shown in FIG. 9. The difference from the corresponding part of the representation of FIG. 1 is only that the values of the control factors FR.I and FR.I instead of the values of the control deviations RAW.I and RAW.II are fed to the phase calculation step 23. In FIG. 9 too, a solid line leads from the phase correction step 24 to the control step 21.II, whereas a dashed line leads to the control step 21.I. This is intended to indicate that in all cases either it is possible to maintain one of the control-factor signals, in the example the control-factor signal FR.I, and correct only the other one (FIGS. 5 and 6) or it is possible each time to refer to the earliest signal and correct the other one. In this case, the phase correction step 24 must supply a correction value one time to the first control step 21.I and another time to the control step 21.II.

Figure 10:
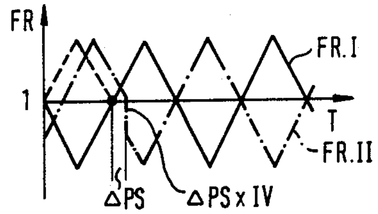
FIG. 10 shows a diagram relating to the time course of the output values of two phase-shifted control circuits with one signal lagging; and, FIG. 11 shows a diagram corresponding to that of FIG. 10, but with the signal there lagging now leading.
Figure 11:
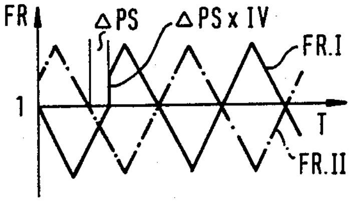

In order to determine the phase shift between the control-factor signals FR.I and FR.II, it is beneficial to make use of the passage through the fixed value 1. Accordingly, in the representations of FIGS. 6 and 11, the reference point is located on the subsidiary line for the mentioned value. The reference point is in each case the time point at which one of the two signals FR.I and FR.II is first to reach the value 1. In FIG. 10, this is the signal FR.I, since the signal FR.II lags. In FIG. 11, the opposite is the case. In each instance, the time interval ΔPS occurring between the passage of the earlier signal through the value 1 and the passage of the later signal through this value is measured. Accordingly, in FIG. 10, the lagging signal FR.II is reduced by the amount of the value $\Delta PS \times IV$, so that it reaches that lower value which it would have assumed if, in the decreasing state, it had already passed through the value 1 by the amount of the time interval ΔPS earlier, that is at the same time as the passage of FR.I from the bottom upwards. Conversely, in the operation according to FIG. 11, at the end of the time interval ΔPS, the signal FR.I is increased by the amount of the value $\Delta PS \times IV$ in order to cancel its lag in relation to the signal FR.II. In cases according to those of FIGS. 10 and 11 too, the correction step can be broken down into several individual steps, should a single correction step be undesirably large.

Of the methods described, those using one of the signal courses of the control factors as a continuous reference course have the advantage of simplicity. In contrast, those methods referring each time to the earliest phase are faster. The correction need not necessarily take place in jumps, but can also be carried out by varying the integration times, with which the control-deviation values are integrated to form the control factors.

A device for carrying out the methods described and also other methods working on the general principle shown is preferably provided by a microcomputer, to which the signals of the two lambda probes are fed and which has two means for the two-position control, one means for determining the actual phase shift and one means for setting the desired phase shift between the two control circuits. If there are more than two control circuits with associated lambda probes, the device has a means for determining the actual phase shift occurring between the control oscillations which are generated by two means of two-position control, and the means for setting the desired phase shifts is configured so that it always maintains a desired phase shift between two associated control circuits.

I claim:

1. A method for controlling lambda in an internal combustion engine having at least two cylinder units and being equipped with at least two lambda probes in like positions corresponding to respective ones of the cylinder units, the method comprising the steps of:

two-position controlling at least two air-fuel mixtures for respective ones of the cylinder units in at least two control circuits, respectively, wherein control oscillations are generated; and, setting desired phase shifts between the control oscillations.

2. The method of claim 1, wherein the phase of one of the control circuits is used continuously as a reference phase and the phase shift of the other control circuit is set by means of a correction value.

3. The method of claim 1, wherein the earliest phase is used each time as a reference phase and the phase shift of the other control circuit is set by means of a correction value.

4. The method of claim 2, wherein the phase adaptation is carried out by the addition or subtraction of the correction value which is determined from the product of phase-shift difference and the control integration variable, the phase-shift difference being the time difference between measured and predetermined phase difference.

5. The method of claim 2, comprising the further steps of:

breaking down the correction value into a plurality of individual values when a maximum value is exceeded with each of said individual values corresponding to at most said maximum value, and, adding or subtracting these individual values with a time offset relative to one another.

6. The method of claim 5, wherein the time offset corresponds to a computing cycle of a microcomputer.

7. The method of claim 1, wherein a phase shift of approximately half an oscillation period is set for the two control circuits.

8. A device for controlling lambda for an internal combustion engine having at least two cylinder units and at least two lambda probes corresponding to respective ones of said cylinder units and mounted in like positions vis-a-vis the cylinder unit corresponding thereto, the device comprising:

first two-position control circuit means corresponding to a first one of said lambda probes and generating a first control oscillation;

second two-position control circuit means corresponding to a second one of said lambda probes and generating a second oscillation;

means for determining the actual phase shift between said first and second oscillations; and, means for setting the desired phase shift between said first and second two-position control circuit means.

* * * * *

UNITED STATES PATENT AND TRADEMARK OFFICE
CERTIFICATE OF CORRECTION

PATENT NO. : 4,984,551

DATED : January 15, 1991

INVENTOR(S) : Winfried Moser

It is certified that error appears in the above-identified patent and that said Letters Patent is hereby corrected as shown below:

In column 1, line 24: delete "2,255,879" and substitute -- 2,255,874 -- therefor.

In column 1, line 54: delete "providing" and substitute -- provide -- therefor.

In column 5, line 14: delete "FIGs. 5" and substitute -- FIGS. 5 -- therefor.

In column 5, line 27: between "phase" and "and" insert -- , --.

In column 5, line 46: delete "APS x IV" and substitute -- $\Delta$PS x IV -- therefor.

In column 6, line 64: delete "FR.I" (second occurrence) and substitute -- FR.II -- therefor.

In column 8, line 35: delete "value," and substitute -- value; -- therefor.

Signed and Sealed this

Nineteenth Day of May, 1992

*Attest:*

DOUGLAS B. COMER

*Attesting Officer*

*Acting Commissioner of Patents and Trademarks*